(12) United States Patent
Mitsuhashi et al.

(10) Patent No.: US 11,291,062 B2
(45) Date of Patent: Mar. 29, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Hiroyuki Mitsuhashi, Kanagawa (JP); Yohei Makino, Kanagawa (JP); Akihiro Ishii, Kanagawa (JP); Yusuke Taguchi, Kanagawa (JP); Shuhei Toda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/032,730

(22) Filed: Sep. 25, 2020

(65) Prior Publication Data
US 2021/0251026 A1    Aug. 12, 2021

(30) Foreign Application Priority Data
Feb. 12, 2020    (JP) .............................. JP2020-021860

(51) Int. Cl.
| | | |
|---|---|---|
| H04W 76/10 | (2018.01) | |
| H04B 17/00 | (2015.01) | |
| H04W 76/14 | (2018.01) | |
| H04W 4/02 | (2018.01) | |
| G01S 11/02 | (2010.01) | |
| H04W 76/38 | (2018.01) | |
| H04N 1/00 | (2006.01) | |

(52) U.S. Cl.
CPC .............. *H04W 76/14* (2018.02); *G01S 11/02* (2013.01); *H04W 4/023* (2013.01); *H04W 76/38* (2018.02); *H04N 1/00315* (2013.01)

(58) Field of Classification Search
CPC ... H04W 76/14; H04W 4/023; H04W 76/023; H04W 76/38; H04W 8/005; H04W 12/50; H04W 76/10; H04W 24/08; H04B 3/544; H04B 7/18558; H04B 17/101; G01S 11/02; G06F 21/608; H04N 1/00315
See application file for complete search history.

(56) References Cited

U.S. PATENT DOCUMENTS 10,503,449 B2    12/2019    Ito
11,160,085 B2 *  10/2021    Feng .................. H04W 72/048
(Continued)

FOREIGN PATENT DOCUMENTS

| JP | 2013-146048 A | 7/2013 |
| JP | 2017-85485 A | 5/2017 |
| JP | 2018-005668 A | 1/2018 |

*Primary Examiner* — Andrew Wendell
(74) *Attorney, Agent, or Firm* — Oliff PLC (57) ABSTRACT

An information processing apparatus includes a processor configured to measure a distance to a terminal apparatus around the information processing apparatus plural times during a first period before receipt of an operation of a user and during a second period after the receipt of the operation, and establish connection for wireless communication with the terminal apparatus in a case where the measured distances indicate that the terminal apparatus has approached the information processing apparatus during the first period and is within a close range from the information processing apparatus during the second period.

20 Claims, 5 Drawing Sheets

(56) References Cited

U.S. PATENT DOCUMENTS

| | | | |
|---|---|---|---|
| 2013/0009812 A1* | 1/2013 | Sato | B64G 1/36 |
| | | | 342/357.26 |
| 2016/0109958 A1* | 4/2016 | Moon | G06F 1/163 |
| | | | 345/156 |
| 2019/0051072 A1* | 2/2019 | Okada | G07C 9/00309 |
| 2019/0356808 A1* | 11/2019 | Park | H04L 67/18 |
| 2020/0065039 A1 | 2/2020 | Ito | |
| 2020/0134418 A1* | 4/2020 | Harrington | G06F 16/909 |
| 2020/0142092 A1* | 5/2020 | Lemarchand | G01S 7/484 |
| 2020/0349781 A1* | 11/2020 | Warrier | G01S 11/06 |

* cited by examiner

|  | FIRST PERIOD | | | | | | SECOND PERIOD | | | | | | |
|---|---|---|---|---|---|---|---|---|---|---|---|---|---|
|  | t1 | t2 | t3 | t4 | t5 | t6 | t7 | t8 | t9 | t10 | t11 | t12 | t13 |
| TERMINAL APPARATUS 110A | 0.9 | 0.9 | 0.9 | 0.9 | 0.9 | 0.9 | 0.9 | 0.9 | 0.9 | 0.9 | 0.9 | 0.9 | 0.9 |
| TERMINAL APPARATUS 110B | 11.1 | 9.5 | 7.6 | 6.0 | 4.3 | 2.2 | 1.1 | 0.3 | 1.6 | 3.2 | 5.4 | 7.8 | 10.5 |
| TERMINAL APPARATUS 110C | 10.2 | 8.3 | 6.2 | 4.1 | 1.9 | 0.7 | 0.5 | 0.5 | 0.5 | 0.5 | 0.5 | 0.5 | 0.5 |

| | THIRD PERIOD | | | | | | | | | | | | |
|---|---|---|---|---|---|---|---|---|---|---|---|---|
| | t21 | t22 | t23 | t24 | t25 | t26 | t27 | t28 | t29 | t30 | t31 | t32 | t33 |
| TERMINAL APPARATUS 110C | 0.5 | 0.5 | 0.5 | 0.5 | 0.5 | 0.5 | 1.3 | 2.7 | 3.8 | 5.1 | 6.5 | 7.8 | 9 |
| TERMINAL APPARATUS 110D | 1.4 | 1.4 | 1.4 | 1.4 | 1.4 | 1.4 | 0.5 | 0.5 | 0.5 | 0.5 | 0.5 | 0.5 | 0.5 |
| TERMINAL APPARATUS 110A | 0.9 | 0.9 | 0.9 | 0.9 | 0.9 | 0.9 | 0.9 | 0.9 | 0.9 | 0.9 | 0.9 | 0.9 | 0.9 |

FIG. 8

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-021860 filed Feb. 12, 2020.

BACKGROUND

(i) Technical Field

The present disclosure relates to an information processing apparatus and a non-transitory computer readable medium.

(ii) Related Art

Techniques for establishing connection for wireless communication between a processing apparatus and a terminal apparatus of a user are known. For example, Japanese Unexamined Patent Application Publication No. 2017-85485 describes determining, as a candidate to be connected with a mobile terminal, an image forming apparatus for which an amount of change from an intensity of a radio wave recorded before the mobile terminal is brought close to an image forming apparatus to which a user wants to connect the mobile terminal to an intensity of a radio wave recorded after the mobile terminal is brought close to the image forming apparatus is largest among a plurality of image forming apparatuses. Japanese Unexamined Patent Application Publication No. 2013-146048 describes specifying a mobile information terminal that performs close-range wireless communication with an image processing apparatus on the basis of an intensity of a radio wave of the close-range wireless communication and establishing connection for close-range wireless communication with the specified mobile information terminal. Japanese Unexamined Patent Application Publication No. 2018-5668 describes pairing a device of a user and a data processing apparatus when the user logs into the data processing apparatus, in a case where a device voice activation flag is effective for the user.

SUMMARY

In a case where a plurality of terminal apparatuses are present around a processing apparatus, connection for wireless communication may be undesirably established between the processing apparatus and a terminal apparatus different from a terminal apparatus of a user who is operating the processing apparatus. For example, connection for wireless communication may be undesirably established between the processing apparatus and a terminal apparatus that is just brought close to the processing apparatus or between the processing apparatus and a terminal apparatus that is closest to the processing apparatus.

Aspects of non-limiting embodiments of the present disclosure relate to establishing connection for wireless communication between a processing apparatus and a terminal apparatus of a user with high accuracy as compared with a case where a distance between the processing apparatus and the terminal apparatus before and after an operation of the user is received by the processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to measure a distance to a terminal apparatus around the information processing apparatus plural times during a first period before receipt of an operation of a user and during a second period after the receipt of the operation, and establish connection for wireless communication with the terminal apparatus in a case where the measured distances indicate that the terminal apparatus has approached the information processing apparatus during the first period and is within a close range from the information processing apparatus during the second period.

BRIEF DESCRIPTION OF THE DRAWINGS

An exemplary embodiment of the present disclosure will be described in detail based on the following figures, wherein.

DETAILED DESCRIPTION

1. Configuration

Figure 1:
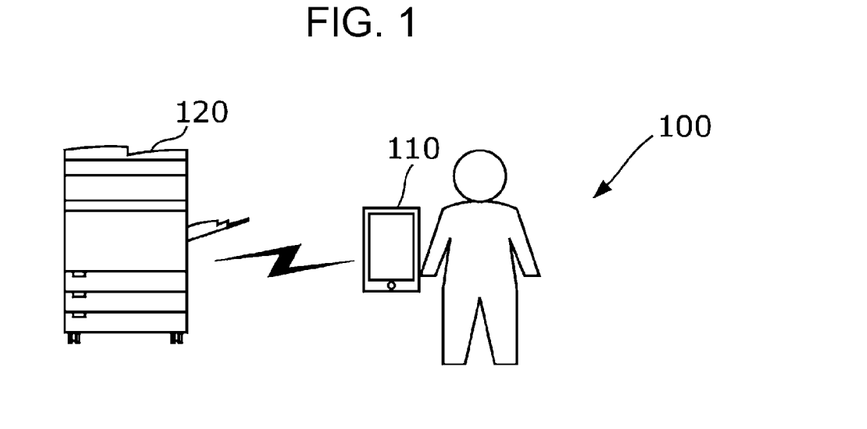
FIG. 1 is a diagram illustrating an example of a configuration of a processing system according to an exemplary embodiment.

FIG. 1 is a diagram illustrating an example of a configuration of a processing system 100 according to an exemplary embodiment. The processing system 100 includes a terminal apparatus 110 and an image processing apparatus 120. The image processing apparatus 120 is an example of an "information processing apparatus" according to the present disclosure. Although a single terminal apparatus 110 and a single image processing apparatus 120 are illustrated in FIG. 1, plural terminal apparatuses 110 and plural image processing apparatuses 120 may be provided. The image processing apparatus 120 performs processing in cooperation with the terminal apparatus 110. This cooperation is realized, for example, by establishing connection for wireless communication. For example, through the cooperation between the image processing apparatus 120 and the terminal apparatus 110, the image processing apparatus 120 can be operated by using the terminal apparatus 110 and the image processing apparatus 120 can be controlled by using information obtained from the terminal apparatus 110. This information may include, for example, biological information of a user. For example, the image processing apparatus 120 may be controlled in accordance with a user's state of mind analyzed from the biological information of the user.

The terminal apparatus 110 is carried by the user. The terminal apparatus 110 may be, for example, a smartphone, a tablet terminal, or a wearable terminal. The terminal apparatus 110 has a communication function. For example, the terminal apparatus 110 has a communication unit (not illustrated) and performs wireless data communication with the image processing apparatus 120. This communication unit is compliant with communication standards such as Bluetooth (Registered Trademark). The terminal apparatus 110 may have a function of measuring biological information. For example, the terminal apparatus 110 has one or more sensors (not illustrated) that measure(s) biological information and thus measures biological information of the user. Examples of the biological information include a heart rate and a blood pressure. For example, the biological information is transmitted to the image processing apparatus 120 and is used for control of the image processing apparatus 120.

Figure 2:
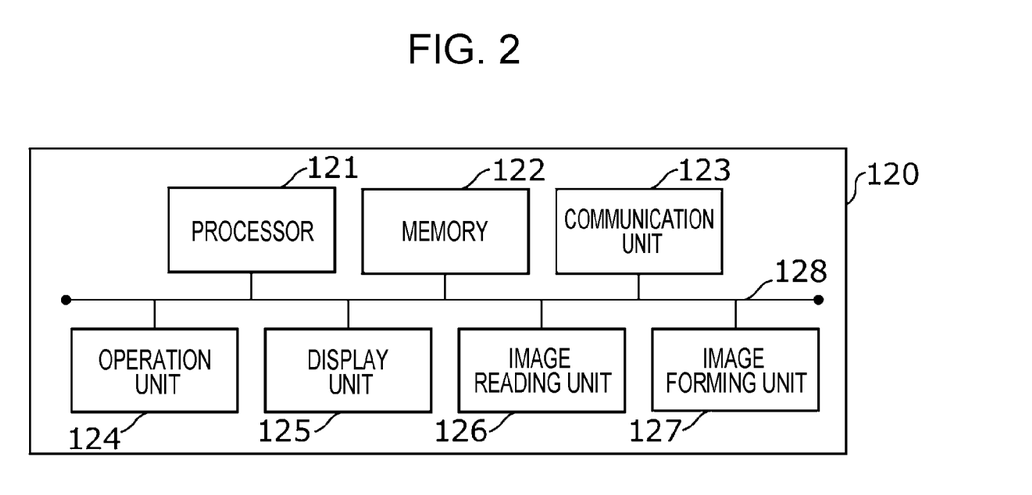
FIG. 2 is a diagram illustrating an example of a configuration of an image processing apparatus.

FIG. 2 is a diagram illustrating an example of a configuration of the image processing apparatus 120. The image processing apparatus 120 has plural functions for processing an image such as a copy function, a print function, a scan function, and a facsimile function. Furthermore, the image processing apparatus 120 has a function for specifying a terminal apparatus 110 of a user who is operating the image processing apparatus 120 on the basis of temporal changes of distances to terminal apparatuses 110 around the image processing apparatus 120 and establishing connection for wireless communication with the specified terminal apparatus 110. A distance from the image processing apparatus 120 to a terminal apparatus 110 can be regarded as a distance from the image processing apparatus 120 to a user of this terminal apparatus 110. The image processing apparatus 120 includes a processor 121, a memory 122, a communication unit 123, an operation unit 124, a display unit 125, an image reading unit 126, and an image forming unit 127. These units are connected through a bus 128.

The processor 121 controls the units of the image processing apparatus 120 or performs various kinds of processing by executing programs. The processor 121 is, for example, a central processing unit (CPU). In the memory 122, the programs executed by the processor 121 are stored. The memory 122 is, for example, a read only memory (ROM) and a random access memory (RAM). For example, a hard disk drive or a solid state drive (SSD) may be used as the memory 122 in addition to the ROM and the RAM. The communication unit 123 performs data communication with another apparatus connected over a communication line. Examples of this communication line include a wireless communication line. The communication unit 123 is compliant with communication standards such as Bluetooth (Registered Trademark). In a case where the communication unit 123 performs communication according to Bluetooth (Registered Trademark), the communication unit 123 has a connection range spreading in all directions within a distance of several meters from the communication unit 123. The communication unit 123 can wirelessly communicate with a terminal apparatus 110 within this connection range according to Bluetooth (Registered Trademark). The operation unit 124 is used by a user to operate the image processing apparatus 120. The operation unit 124 is, for example, a touch panel and buttons. The display unit 125 displays various kinds of information. The display unit 125 is, for example, a liquid crystal display. The image reading unit 126 reads an image and converts the image into image data. The image reading unit 126 is, for example, an image scanner. The image forming unit 127 forms an image corresponding to image data onto a medium such as paper. The image forming unit 127 is, for example, a printer.

2. Operation

In a case where the processor 121 is mentioned as an entity that performs processing in the following description, this means that the processor 121 performs arithmetic processing through cooperation between a program stored in the memory 122 and the processor 121 that executes this program or the processor 121 performs the processing by controlling operation of another hardware element.

Figure 3:
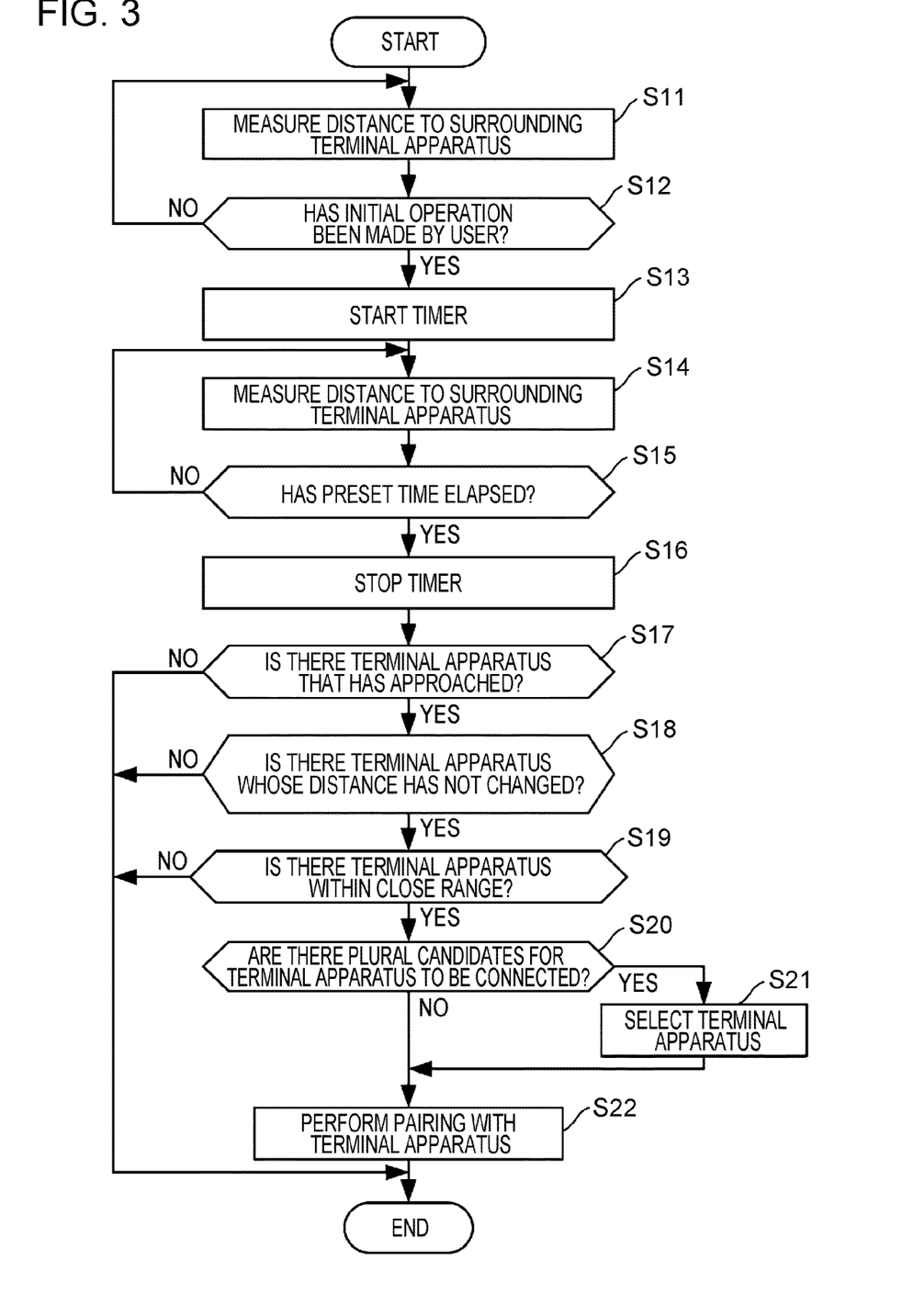
FIG. 3 is a flowchart illustrating an example of processing performed by the image processing apparatus in cooperation with a terminal apparatus.

FIG. 3 is a flowchart illustrating an example of processing performed by the image processing apparatus 120 in cooperation with the terminal apparatus 110. This processing starts, for example, when the terminal apparatus 110 enters the connection range of the communication unit 123.

In step S11, the processor 121 measures a distance from the image processing apparatus 120 to a terminal apparatus 110 around the image processing apparatus 120. In a case where plural terminal apparatuses 110 are present around the image processing apparatus 120, distances to the plural terminal apparatuses 110 are measured. The terminal apparatus(es) 110 around the image processing apparatus 120 is(are), for example, terminal apparatus(es) 110 within the connection range. For example, the terminal apparatus(es) 110 within the connection range is(are) searched for, and a distance(s) to the terminal apparatus(es) 110 found as a result of the search is(are) measured. The distance is measured by a known method such as a method of estimating a distance on the basis of a radio wave intensity of Bluetooth (Registered Trademark). The distance is repeatedly measured at predetermined time intervals. The measured distances are stored, for each terminal apparatus 110, in the memory 122 in chronological order as distances measured during a first period before receipt of an initial operation.

In step S12, the processor 121 determines whether or not an initial operation has been made by a user. The initial operation is, for example, an operation for resuming from a sleep mode or an energy-saving mode. For example, this operation may be an operation of touching a surface of the display unit 125 or may be an operation of pressing a button of the operation unit 124. In a case where an initial operation has not been made by the user (No in step S12), the processing returns to step S11. Meanwhile, in a case where an initial operation has been made by the user (Yes in step S12), the processing proceeds to step S13.

In step S13, the processor 121 starts a timer. The timer measures a preset time. This time is, for example, set in advance to a time for which the user is considered to be operating the image processing apparatus 120.

In step S14, the processor 121 measures a distance(s) from the image processing apparatus 120 to the terminal apparatus(es) 110 around the image processing apparatus 120 as in step S11. The distance is repeatedly measured at predetermined time intervals. The measured distances are stored in the memory 122 in chronological order as distances measured during a second period after the receipt of the initial operation.

In step S15, the processor 121 determines whether or not the preset time has elapsed. In a case where the preset time has not been measured by the timer (No in step S15), the determining process in step S15 is repeated until the preset time is measured by the timer. Meanwhile, in a case where the preset time has been measured by the timer (Yes in step S15), the processing proceeds to step S16. In step S16, the processor 121 stops the timer.

In step S17, the processor 121 determines whether or not there is a terminal apparatus 110 that approached the image processing apparatus 120 during the first period before the receipt of the initial operation of the user by using the distances during the first period stored in the memory 122. Examples of a method for determining the terminal apparatus 110 that approached the image processing apparatus 120 include a first method for determining the terminal apparatus 110 by using a threshold value of an amount of change of a distance and a second method for determining the terminal apparatus 110 by using a threshold value of an absolute value of a distance.

Figure 4:
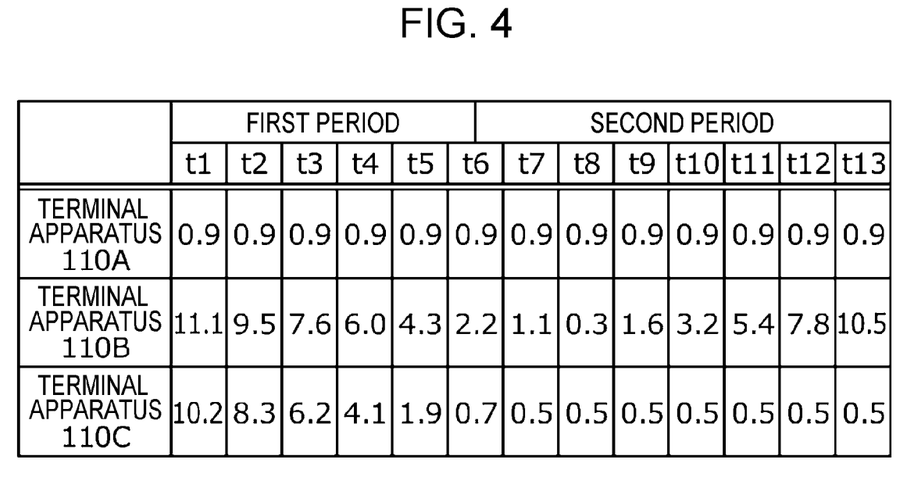
FIG. 4 illustrates an example of distances measured during a first period and a second period.

FIG. 4 illustrates an example of distances measured during the first period and the second period. In the example illustrated in FIG. 4, terminal apparatuses 110A to 110C are present around the image processing apparatus 120, and distances from the image processing apparatus 120 to the terminal apparatuses 110A to 110C are measured at times t1 to t13. The order of the times t1 to t13, among which the time t1 is earliest, is chronological order. It is assumed here that an initial operation is made at the time t6 by a user. That is, a period from the time t1 to the time t6 is the first period before receipt of the initial operation from the user. A period from the time t6 to the time t13 is the second period after the receipt of the initial operation from the user. During the first period and during the second period, the distances are measured plural times. In this example, the time t6 belongs to both of the first period and the second period. Alternatively, the time t6 may belong to either the first period or the second period or may belong to neither the first period nor the second period. That is, distances measured at the time t6 may be included in both of the distances measured during the first period and the distances measured during the second period, may be included in either the distances measured during the first period or the distances measured during the second period, or may be included in neither the distances measured during the first period nor the distances measured during the second period.

According to the first method, it is determined whether or not there is a terminal apparatus 110 that approached the image processing apparatus 120 during the first period on the basis of whether or not a distance has decreased by a first threshold value or larger during the first period. This threshold value is, for example, set in advance to an amount of change of a distance by which it can be regarded that a user of the terminal apparatus 110 has approached the image processing apparatus 120 to use the image processing apparatus 120. It is assumed here that the first threshold value is 2. In the example illustrated in FIG. 4, a distance to the terminal apparatus 110B measured at the time t5 is 4.3, and a distance to the terminal apparatus 110B measured at the time t6 is 2.2. This indicates that the distance has decreased during the first period. An amount of change of the distance is 2.1, which is larger than the first threshold value. It is therefore determined that the terminal apparatus 110B has approached the image processing apparatus 120 during the first period. Furthermore, a distance to the terminal apparatus 110C measured at the time t2 is 8.3, and a distance to the terminal apparatus 110C measured at the time t3 is 6.2. This indicates that the distance has decreased during the first period. An amount of change of the distance is 2.1, which is larger than the first threshold value. It is therefore determined that the terminal apparatus 110C has approached the image processing apparatus 120 during the first period. Meanwhile, all of distances to the terminal apparatus 110A measured at the times t1 to t6 are 0.9. This indicates that the distance has not decreased. An amount of change between successive distances is 0, which is less than the first threshold value. It is therefore determined that the terminal apparatus 110A has not approached the image processing apparatus 120 during the first period.

According to the second method, it is determined whether or not there is a terminal apparatus 110 that approached the image processing apparatus 120 during the first period on the basis of whether or not a distance thereof has changed from a distance larger than a second threshold value to a distance equal to or smaller than the second threshold value during the first period. This second threshold value is, for example, set in advance to a distance by which it can be regarded that a user of the terminal apparatus 110 has moved close to the image processing apparatus 120 to use the image processing apparatus 120. It is assumed here that the second threshold value is 5. In the example illustrated in FIG. 4, a distance to the terminal apparatus 110B measured at the time t4 is 6.0, which is larger than the second threshold value, and a distance to the terminal apparatus 110B measured at the time t5 is 4.3, which is smaller than the second threshold value. This indicates that the distance has changed from a distance larger than the second threshold value to a distance equal to or smaller than the second threshold value during the first period. It is therefore determined that the terminal apparatus 110B has approached the image processing apparatus 120 during the first period. A distance to the terminal apparatus 110C measured at the time t3 is 6.2, which is larger than the second threshold value, and a distance to the terminal apparatus 110C measured at the time t4 is 4.1, which is smaller than the second threshold value. This indicates that the distance has changed from a distance larger than the second threshold value to a distance equal to or smaller than the second threshold value. It is therefore determined that the terminal apparatus 110C has approached the image processing apparatus 120 during the first period. Meanwhile, all of distances to the terminal apparatus 110A measured at the times t1 to t6 are 0.9, which is smaller than the second threshold value. This indicates that the distance has not changed from a distance larger than the second threshold value to a distance equal to or smaller than the second threshold value during the first period. It is therefore determined that the terminal apparatus 110A has not approached the image processing apparatus 120 during the first period.

In a case where it is determined that there is no terminal apparatus 110 that has approached the image processing apparatus 120 during the first period (No in step S17), the processing ends. Meanwhile, in a case where it is determined that there is a terminal apparatus 110 that has approached the image processing apparatus 120 (Yes in step S17), the processing proceeds to step S18.

In step S18, the processor 121 determines whether or not the terminal apparatus(es) 110 determined in step S17 to have approached the image processing apparatus 120 during the first period include(s) a terminal apparatus 110 whose distance has not changed during the second period after the receipt of the initial operation of the user by using distances during the second period stored in the memory 122. The case where "the distance has not changed" is not limited to a case where the distance has not changed at all and encompasses a case where the distance has changes slightly. This determining process is performed, for example, by determining whether or not an amount of change of the distance is equal to or smaller than a third threshold value continuously for the second period. The third threshold value is, for example, set to an amount of change of the distance by which it can be regarded that the user of the terminal apparatus 110 is not moving relative to the image processing apparatus 120. It is assumed here that the third threshold value is 1.

In the example illustrated in FIG. 4, a distance to the terminal apparatus 110C measured at the time t6 is 0.7, and all of distances to the terminal apparatus 110C measured at the times t7 to t13 are 0.5. An amount of change of the distance is 0 to 0.2, which is smaller than the third threshold value. This indicates that the amount of change of the distance is equal to or smaller than the third threshold value continuously for the second period. It is therefore determined that the distance to the terminal apparatus 110C has not changed during the second period. Meanwhile, a distance to the terminal apparatus 110B measured at the time t8 is 0.3, and a distance to the terminal apparatus 110B measured at the time t9 is 1.6. An amount of change of the distance is 1.3, which is larger than the third threshold value. This indicates that the amount of change of the distance is not equal to or smaller than the third threshold value continuously for the second period. It is therefore determined that the distance to the terminal apparatus 110B has changed during the second period.

In a case where it is determined that there is no terminal apparatus 110 whose distance has not changed during the second period (No in step S18), the processing ends. Meanwhile, in a case where it is determined that there is a terminal apparatus 110 whose distance has not changed during the second period (Yes in step S18), the processing proceeds to step S19.

In step S19, the processor 121 determines whether or not the terminal apparatus(es) 110 determined in step S18 as a terminal apparatus 110 whose distance has not changed during the second period include(s) a terminal apparatus 110 that is within a close range during the second period by using the distances during the second period stored in the memory 122. This close range is, for example, set in advance to a range in which a user operating the image processing apparatus 120 is considered to be present. A distance of the close range is equal to or smaller than a fourth threshold value from the image processing apparatus 120. In this case, it is determined that a terminal apparatus 110 is within the close range during the second period in a case where a distance from the image processing apparatus 120 to the terminal apparatus 110 is equal to or smaller than the fourth threshold value continuously during the second period. It is assumed here that the fourth threshold value is 1.

In the example illustrated in FIG. 4, a distance to the terminal apparatus 110C measured at the time t6 is 0.7, which is smaller than the fourth threshold value, and all of distances to the terminal apparatus 110C measured at the times t7 to t13 are 0.5, which is smaller than the fourth threshold value. This indicates that the distance from the image processing apparatus 120 to the terminal apparatus 110C is equal to or smaller than the close range continuously during the second period. It is therefore determined that the terminal apparatus 110C is within the close range during the second period.

In a case where it is determined that there is no terminal apparatus 110 within the close range during the second period (No in step S19), the processing ends. Meanwhile, in a case where it is determined that there is a terminal apparatus 110 within the close range during the second period (Yes in step S19), the processing proceeds to step S20.

Figure 5:
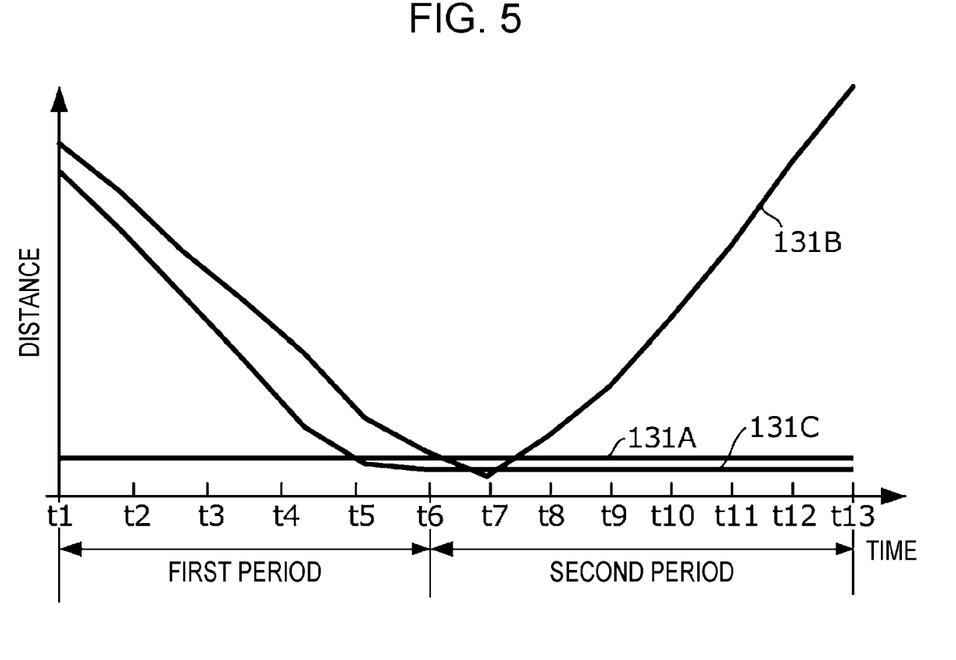
FIG. 5 illustrates temporal changes of distances of terminal apparatuses.

In step S20, the processor 121 determines whether or not there are plural candidates for a terminal apparatus 110 to be connected. These candidates for the terminal apparatus 110 to be connected are terminal apparatuses 110 determined as Yes in steps S18 to S20. FIG. 5 illustrates temporal changes of distances of the terminal apparatuses 110A to 110C. In FIG. 5, the vertical axis represents a distance, and the horizontal axis represents a time. Lines 131A to 131C indicate distances of the terminal apparatuses 110A to 110C measured at the times t1 to t13.

The line 131A indicates that the terminal apparatus 110A is always located close to the image processing apparatus 120 during the first period and the second period. In this case, the terminal apparatus 110A does not approach the image processing apparatus 120 during the first period, and therefore a result of the determining process in step S17 is No. Therefore, the terminal apparatus 110A is not a candidate for the terminal apparatus 110 to be connected. This is because the user of the terminal apparatus 110A can be considered as not operating the image processing apparatus 120 although the user of the terminal apparatus 110A is always close to the image processing apparatus 120 during the first period and the second period, and therefore the user of the terminal apparatus 110A can be regarded as not being a user who operated the image processing apparatus 120 in step S12.

The line 131B indicates that the terminal apparatus 110B approached the image processing apparatus 120 during the first period and moved away from the image processing apparatus 120 during the second period. In this case, a distance of the terminal apparatus 110B from the image processing apparatus 120 changes during the second period, and therefore a result of the determining process in step S18 is No. Accordingly, the terminal apparatus 110B is not a candidate for the terminal apparatus 110 to be connected. This is because the user of the terminal apparatus 110B can be considered to have just passed close the image processing apparatus 120 without operating the image processing apparatus 120 and therefore can be regarded as not being a user who operated the image processing apparatus 120 in step S12.

Meanwhile, the line 131C indicates that the terminal apparatus 110C approached the image processing apparatus 120 during the first period and has stopped close to the image processing apparatus 120 during the second period. In this case, all of results of the determining processes steps S17 to S19 concerning the terminal apparatus 110C are Yes. Accordingly, the terminal apparatus 110C is a candidate for the terminal apparatus 110 to be connected. This is because the user of the terminal apparatus 110C can be considered as operating the image processing apparatus 120 after approaching the image processing apparatus 120 and therefore can be regarded as a user who operated the image processing apparatus 120 in step S12. In a case where only the terminal apparatus 110C is a candidate for the terminal apparatus 110 to be connected (No in step S20), the processing proceeds to step S22.

In step S22, the processor 121 performs pairing with the target terminal apparatus 110. For example, a connection request is transmitted from the communication unit 123 to the target terminal apparatus 110 according to Bluetooth (Registered Trademark), and connection for wireless communication with the terminal apparatus 110 is thus established. For example, in a case where only the terminal apparatus 110C is a candidate for the terminal apparatus 110 to be connected, pairing with the terminal apparatus 110C is performed. The pairing with the target terminal apparatus 110 enables wireless data communication with this terminal apparatus 110. This allows the image processing apparatus 120 to performs processing in cooperation with the target terminal apparatus 110.

Meanwhile, in a case where there are plural candidates for the terminal apparatus 110 to be connected in step S20 (Yes in step S20), the processing proceeds to step S21. In step S21, the processor 121 selects any of the plural candidates for the terminal apparatus 110 to be connected. For example, any of the following first to thirds methods can be used to select the terminal apparatus 110.

According to the first method, a terminal apparatus 110 whose measured distance is smallest among the plural candidates for the terminal apparatus 110 to be connected is selected. For example, in a case where a smallest distance measured for one of the candidates is 0.5, and a smallest distance measured for the other candidates is 0.9, the one of the candidates is selected. As a result, for example, in a case where one image processing apparatus 120 and other image processing apparatuses 120 are disposed side by side and terminal apparatuses 110 of users who operate these image processing apparatuses 120 become candidates, a terminal apparatus 110 whose distance from the one image processing apparatus 120 is smallest is selected. In this case, terminal apparatuses 110 of users who operate the other image processing apparatuses 120 are not selected.

According to the second method, a terminal apparatus 110 that is largest in the number of times of pairing in the past among the plural candidates for the terminal apparatus 110 to be connected is selected. In this case, a history of pairing with each of the terminal apparatuses 110 is stored in the memory 122. This history is an example of a "history of connection for wireless communication" according to the present disclosure. This history includes, for example, an identifier uniquely identifying a terminal apparatus 110 and time and date of pairing. Furthermore, identifiers are acquired from the plural candidates for the terminal apparatus 110 to be connected. The number of times of pairing is counted for each of the candidates for the terminal apparatus 110 to be connected on the basis of the history acquired from the memory 122 and the identifiers. The number of times of pairing is an example of "the number of times of wireless communication" according to the present disclosure. Then, a terminal apparatus 110 that is largest in the number of times of pairing is selected. For example, in a case where the number of times of paring with one of the candidates for the terminal apparatus 110 to be connected is 10, and the number of times of paring with the other candidates for the terminal apparatus 110 to be connected is 1, the one of the candidates is selected.

According to the third method, a terminal apparatus 110 selected by a user's operation among the plural candidates for the terminal apparatus 110 to be connected is selected. In this case, a selection screen for selecting any one of the plural candidates for the terminal apparatus 110 to be connected is displayed on the display unit 125. This selection screen includes, for example, a list of the plural candidates for the terminal apparatus 110 to be connected. Alternatively, the selection screen may include a list of all terminal apparatuses 110 whose distances have been measured. On the selection screen, the user selects any of the plural candidates for the terminal apparatus 110 to be connected. A terminal apparatus 110 thus selected by this operation is selected. For example, in a case where one terminal apparatus 110 is selected from among the candidates for the terminal apparatus 110 to be connected by a user's operation, the one terminal apparatus 110 is selected.

When any of the plural candidates for the terminal apparatus 110 to be connected is selected in step S21, pairing with the selected terminal apparatus 110 is performed in step S22.

Figure 6:
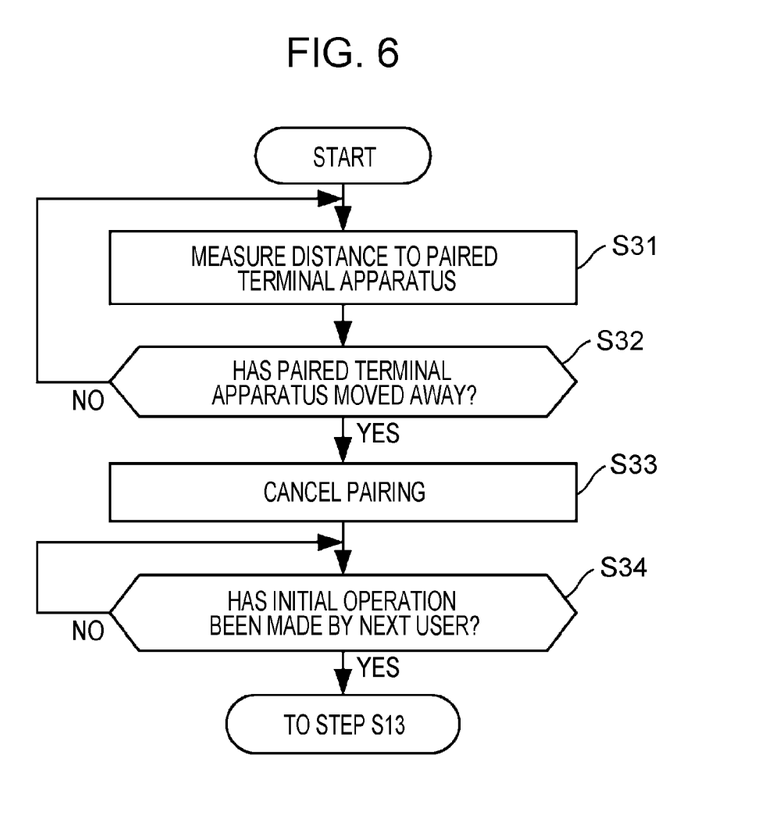
FIG. 6 is a flowchart illustrating an example of processing performed by the image processing apparatus after linkage with the terminal apparatus.

FIG. 6 is a flowchart illustrating an example of processing performed by the image processing apparatus 120 after linkage with the terminal apparatus 110. This processing starts, for example, when pairing with the terminal apparatus 110 is performed in step S22.

In step S31, the processor 121 measures a distance from the image processing apparatus 120 to the paired terminal apparatus 110 as in step S11. The distance is repeatedly measured at constant time intervals. The measured distances are stored in the memory 122 in chronological order as distances measured during a third period after the pairing. In step S31, distances to the other terminal apparatuses 110 around the image processing apparatus 120 may be measured in addition to the distance to the paired terminal apparatus 110.

In step S32, the processor 121 determines whether or not the paired terminal apparatus 110 has moved away during the third period after the pairing by using the distances during the third period stored in the memory 122. In this determining process, for example, it is determined whether or not the distance has changed from a distance smaller than a fifth threshold value to a distance equal to or larger than the fifth threshold value during the third period. The fifth threshold value is, for example, set in advance to a distance by which it can be regarded that the user of the terminal apparatus 110 is already away from the image processing apparatus 120 and is no longer operating the image processing apparatus 120. It is assumed here that the fifth threshold value is 1.

Figure 7:
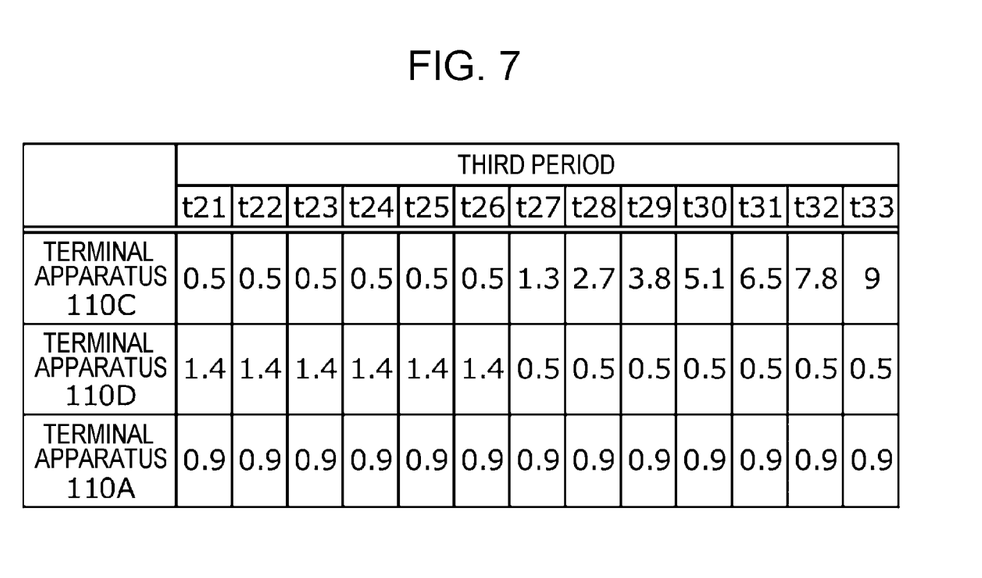
FIG. 7 illustrates an example of distances measured during a third period.

FIG. 7 illustrates an example of distances measured during the third period. In the example illustrated in FIG. 7, distances to the terminal apparatuses 110A, 110C, and 110D are measured at times t21 to t33. The order of the times t21 to t33, among which the time t21 is earliest, is chronological order. It is assumed here that the image processing apparatus 120 is paired with the terminal apparatus 110C before the time t21. That is, the times t21 to t33 are the third period after the pairing. The distances are measured plural times during the third period.

In the example illustrated in FIG. 7, a distance to the terminal apparatus 110C measured at the time t26 is 0.5, which is smaller than the fifth threshold value, and a distance to the terminal apparatus 110C measured at the time t27 is 1.3, which is larger than the fifth threshold value. This indicates that the distance has changed from a distance smaller than the fifth threshold value to a distance equal to or larger than the fifth threshold value during the third period. It is therefore determined that the terminal apparatus 110C has moved away from the image processing apparatus 120 during the third period.

In a case where it is determined that the paired terminal apparatus 110 has not moved away from the image processing apparatus 120 during the third period after the pairing (No in step S32), the processing returns to step S31. Meanwhile, in a case where it is determined that the paired terminal apparatus 110 has moved away from the image processing apparatus 120 during the third period after the pairing (Yes in step S32), the processing proceeds to next step S33.

In step S33, the processor 121 cancels the pairing performed in step S22. For example, a disconnection request is transmitted from the communication unit 123 to the terminal apparatus 110 according to Bluetooth (Registered Trademark), connection for wireless communication with the terminal apparatus 110 is thus cut off. For example, in a case where the image processing apparatus 120 is paired with the terminal apparatus 110C, the pairing with the terminal apparatus 110C is canceled.

Figure 8:
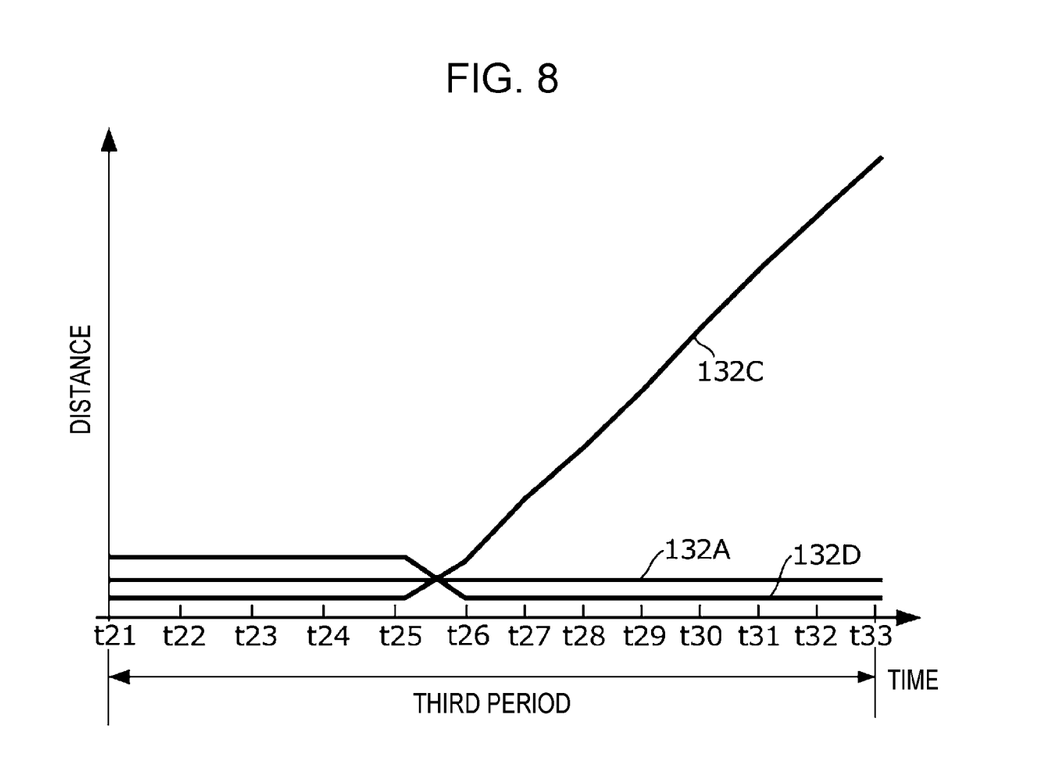
FIG. 8 illustrates temporal changes of distances of terminal apparatuses.

FIG. 8 illustrates temporal changes of distances of the terminal apparatuses 110A, 110C, and 110D. In FIG. 8, the vertical axis represents a distance, and the horizontal axis represents a time. The lines 132A, 132C, and 132D indicate distances of the terminal apparatuses 110A, 110C, and 110D measured at the times t21 to t33.

The line 132C indicates that the terminal apparatus 110C has moved away from the image processing apparatus 120 during the third period. In this case, pairing with the terminal apparatus 110C is cancelled. This is because it can be considered that the user of the terminal apparatus 110C has finished using the image processing apparatus 120 and moved away from the image processing apparatus 120 after operating and using the image processing apparatus 120 through pairing between the terminal apparatus 110C and the image processing apparatus 120 and therefore it can be regarded that processing performed in cooperation with the terminal apparatus 110C has been finished.

In step S34, the processor 121 determines whether or not a next user has made an initial operation. In the example illustrated in FIG. 8, the line 132D indicates that the terminal apparatus 110D has approached the image processing apparatus 120 during the third period. This is because a user of the terminal apparatus 110D who was waiting behind the user of the terminal apparatus 110C to use the image processing apparatus 120 has started using the image processing apparatus 120 since the user of the terminal apparatus 110C has finished using the image processing apparatus 120. In this case, the user of the terminal apparatus 110D starts operating the image processing apparatus 120 by using the operation unit 124. However, in a case where a next user starts operating the image processing apparatus 120 immediately after a previous user, there is a possibility that the image processing apparatus 120 has not shifted to a sleep mode or an energy-saving mode yet. Accordingly, the initial operation of the next user need not be an operation for resuming from the sleep mode or the energy-saving mode. The initial operation of the next user may be any operation that is made for the first time after it is determined that the terminal apparatus 110C has moved away from the image processing apparatus 120. For example, the initial operation of the next user may be an operation for selecting a function of the image processing apparatus 120.

In a case where an initial operation has not been made by a next user (No in step S34), the determining process in step S34 is repeated until an initial operation is made by a next user. Meanwhile, in a case where an initial operation has been made by a next user (Yes in step S34), the processing returns to step S13. In this case, a first period and a second period are set on the basis of the initial operation made by the next user, and the processes in step S13 and subsequent steps are performed. For example, a period before the initial operation of the next user is set as the first period, and a period after this operation is set as the second period. Then, the processes in steps S13 to S22 are performed on the basis of the first period and the second period thus set. For example, pairing with the terminal apparatus 110D of the next user is performed.

According to the exemplary embodiment described above, the image processing apparatus 120 is paired with a terminal apparatus 110 that approaches the image processing apparatus 120 before an initial operation of a user and remains close to the image processing apparatus 120 after this operation, and therefore connection for wireless communication between the image processing apparatus 120 and the terminal apparatus 110 of the user can be established with higher accuracy than in a case where distances between the image processing apparatus 120 and the terminal apparatus 110 before and after receipt of the operation are not considered. If pairing is performed with a terminal apparatus 110 closest to the image processing apparatus 120, the image processing apparatus 120 may be undesirably paired, for example, with a terminal apparatus 110 of a user who is not operating the image processing apparatus 120 behind the image processing apparatus 120 in a case where the communication unit 123 is provided on a rear surface of the image processing apparatus 120. However, in the present exemplary embodiment, the image processing apparatus 120 is paired with a terminal apparatus 110 that approaches the image processing apparatus 120 before an initial operation of a user and remains within a close range of the image processing apparatus 120 after this operation. Therefore, the image processing apparatus 120 is paired with a terminal apparatus 110 of a user who operates the image processing apparatus 120.

The image processing apparatus 120 and the terminal apparatus 110 are paired without a user's operation. This saves the user the trouble of performing an operation for pairing such as selecting a target terminal apparatus 110. Furthermore, if the image processing apparatus 120 is paired with a terminal apparatus 110 by a user's operation, the image processing apparatus 120 may be undesirably paired with an unintended terminal apparatus 110 as a result of user's erroneous selection of the terminal apparatus 110, for example, in a case where a large number of terminal apparatuses 110 are present within a connection range of the image processing apparatus 120. However, in the present exemplary embodiment, the image processing apparatus 120 is paired with a terminal apparatus 110 without a user's operation. This prevents the image processing apparatus 120 from being paired with an unintended terminal apparatus 110, for example, as a result of a user's erroneous operation.

Furthermore, in a case where there are plural candidates for a terminal apparatus 110 to be connected, any of the plural candidates for the terminal apparatus 110 to be connected is selected, and the image processing apparatus 120 is paired with the selected terminal apparatus 110. This can prevent connection for wireless communication from being established with plural terminal apparatuses 110. Furthermore, in a case where the image processing apparatus 120 is paired with a terminal apparatus 110 closest to the image processing apparatus 120 among the plural candidates for the terminal apparatus 110 to be connected, connection for wireless communication can be established with the terminal apparatus 110 closest to the image processing apparatus 120. Furthermore, in a case where the image processing apparatus 120 is paired with a terminal apparatus 110 that is largest in the number of times of pairing in the past among the plural candidates for the terminal apparatus 110 to be connected, connection for wireless communication can be established with the terminal apparatus 110 that is largest in the number of times of pairing in the past. Furthermore, in a case where the image processing apparatus 120 is paired with a terminal apparatus 110 selected by a user among the plural candidates for the terminal apparatus 110 to be connected, connection for wireless communication can be established with the terminal apparatus 110 selected by the user.

Furthermore, the pairing is cancelled when the paired terminal apparatus 110 moves away from the image processing apparatus 120. This can prevent connection with the terminal apparatus 110 of the user from being kept even after the user finishes using the image processing apparatus 120. Furthermore, a first period and a second period are set on the basis of an initial operation made after the cancellation of the pairing, and the processes in step S13 and subsequent steps are performed. Therefore, a terminal apparatus 110 of a next user can be specified on the basis of the periods set on the basis of the initial operation made after a user finishes using the image processing apparatus 120, and connection for wireless communication can be established with this terminal apparatus 110.

3. Modification

The above exemplary embodiment is an example of the present disclosure. The present disclosure is not limited to the above exemplary embodiment. The above exemplary embodiment may be modified as in the following examples. Two or more modifications below may be combined.

3-1. Modification 1

In the above exemplary embodiment, the processor 121 may change the standards used for the determining processes in steps S17 to S19 so that the image processing apparatus 120 is paired with a terminal apparatus 110 of a user who operates the image processing apparatus 120 on the basis of tendency of a temporal change of a distance to an actually paired terminal apparatus 110. The standards include, for example, the first to fourth threshold values used in steps S17 to S19, a length of the first period, and a length of the second period. In this case, a history of distances to the actually paired terminal apparatus 110 is stored in the memory 122. The actually paired terminal apparatus 110 is, for example, the terminal apparatus 110 selected by the user in step S21. For example, after the image processing apparatus 120 is paired with a terminal apparatus 110 in step S22, a history of distances to this terminal apparatus 110 during the first period and the second period is stored in the memory 122. Then, in the following processes, at least one of the first to fourth threshold values, the length of the first period, and the length of the second period is changed on the basis of the history of the distances acquired from the memory 122 so that a terminal apparatus 110 of a user who operates the image processing apparatus 120 becomes a candidate. Only a standard applied to a target terminal apparatus 110 may be changed or a standard applied to all of the terminal apparatuses 110 may be changed. In a case where only a standard applied to a target terminal apparatus 110 is changed, an identifier is acquired from a terminal apparatus 110 whose distances have been measured, and an applied standard for a determining process is switched on the basis of this identifier.

For example, in a case where a maximum amount of change of a distance to a paired terminal apparatus 110 during the first period is 1.5 or less, the first threshold value used in step S17 for this terminal apparatus 110 may be changed to 1.5. In this case, next time and thereafter, the determining process in step S17 is performed by using the changed first threshold value as for this terminal apparatus 110. Alternatively, the first threshold value used in step S17 for all terminal apparatuses 110 may be changed to 1.5. In this case, next time and thereafter, the determining process in step S17 is performed by using the changed first threshold value as for all terminal apparatuses 110. In a case where a distance to a paired terminal apparatus 110 does not change for 1 minute during the second period, the second period used for this terminal apparatus 110 or all terminal apparatuses 110 may be changed to 1 minute. In this case, next time and thereafter, the determining process in step S18 is performed by using the changed second period as for this terminal apparatus 110 or all terminal apparatuses 110.

The processing according to this modification is processing for reflecting a result of actual pairing in a process for determining a terminal apparatus 110 to be paired and is therefore a kind of feedback processing. According to this modification, a standard used for a process for determining a candidate for a terminal apparatus 110 to be connected is changed on the basis of a history of distances of an actually paired terminal apparatus 110. As a result, a terminal apparatus 110 of a user who is operating the image processing apparatus 120 is more likely to be connected for wireless communication with the image processing apparatus 120, as compared with a case where the standard is not changed. A machine learning model for determining a target terminal apparatus 110 may be generated through machine learning of a history of distances of an actually paired terminal apparatus 110. In this case, a terminal apparatus 110 to be connected may be determined by using the machine learning model.

3-2. Modification 2

In the above exemplary embodiment, the processor 121 may change standards used in the determining processes in steps S17 to S19 so that the image processing apparatus 120 is paired with a terminal apparatus 110 of a user who operates the image processing apparatus 120 in a case where a situation around the image processing apparatus 120 is a specific situation. The specific situation is a situation in which accuracy of determining a candidate for a terminal apparatus 110 to be connected decreases. For example, the specific situation is a situation where plural users are lining up in front of the image processing apparatus 120 to use the image processing apparatus 120. For example, it is determined that plural users are lining up in front of the image processing apparatus 120 to use the image processing apparatus 120 in a case where a distance change pattern such that distances of plural terminal apparatuses 110 remain the same continuously for a certain period, then slightly decrease, and then remain the same continuously for a certain period is repeated during the first period. In this case, amounts of change of distances of the terminal apparatuses 110 may be small even when the users lining up in front of the image processing apparatus 120 approach the image processing apparatus 120 to use the image processing apparatus 120. Accordingly, there is a possibility that it is not determined that the terminal apparatuses 110 of these users have approached the image processing apparatus 120 in step S17. In view of this, in a case where distances of plural terminal apparatuses 110 measured during the first period indicate a situation where plural users are lining up in front of the image processing apparatus 120 to use the image processing apparatus 120, the first threshold value used in step S17 may be changed to a smaller value before the process in step S17 is performed. As a result, in a case where the users lining up in front of the image processing apparatus 120 approach the image processing apparatus 120 to use the image processing apparatus 120, it is determined that the terminal apparatuses 110 of these users have approached the image processing apparatus 120 in step S17.

In a case where plural users are lining up in front of the image processing apparatus 120 to use the image processing apparatus 120, a user lining up in front of the image processing apparatus 120 may be also within the close range of the image processing apparatus 120 in addition to a user who is operating the image processing apparatus 120. In this case, it may be undesirably determined that the terminal apparatus 110 of the user who is not operating the image processing apparatus 120 is within the close range of the image processing apparatus 120 in step S19. In view of this, in a case where distances of plural terminal apparatuses 110 measured during the first period indicate a situation where plural users are lining up in front of the image processing apparatus 120 to use the image processing apparatus 120, the close range used in step S19 may be changed to a smaller range before the process in step S19 is performed.

The processing according to this modification is processing for removing a cause for decreasing determination accuracy before determination of a terminal apparatus 110 to be paired and is therefore one kind of feedforward processing. According to this modification, in a case where a situation around the image processing apparatus 120 is a specific situation, a standard used for a process for determining a candidate for a terminal apparatus to be connected is changed. As a result, a terminal apparatus 110 of a user who is operating the image processing apparatus 120 is more likely to be connected for wireless communication with the image processing apparatus 120 under the specific situation as compared with a case where the standard is not changed.

3-3. Modification 3

In the above exemplary embodiment, only distances to one or some of terminal apparatuses 110 within the connection range of the communication unit 123 may be measured. For example, only distances to a terminal apparatus 110 within a set range smaller than the connection range may be measured. This set range may be, for example, a range of 2 m from the image processing apparatus 120. In this case, distances to a terminal apparatus 110 that is within the connection range but is out of the set range need not be measured. Alternatively, distances to a terminal apparatus 110 that is within the connection range but is out of the set range may be deleted from the memory 122 after being measured. Alternatively, the connection range may be changed to the set range by adjusting a radio wave intensity of the communication unit 123. In this case, only distances to a terminal apparatus 110 within the set range are measured.

Only distances to a terminal apparatus 110 that has been paired with the image processing apparatus 120 in the past among terminal apparatuses 110 within the connection range may be measured. In this case, a history of paring of each terminal apparatus 110 is stored in the memory 122. This history includes, for example, an identifier of the terminal apparatus 110 and time and date of pairing. Furthermore, identifiers of the terminal apparatuses 110 within the connection range are acquired. It is determined whether or not the terminal apparatuses 110 within the connection range have been paired with the image processing apparatus 120 in the past on the basis of the history acquired from the memory 122 and the identifiers. For example, in a case where an identifier of a terminal apparatus 110 within the connection range is included in the history of pairing, it is determined that this terminal apparatus 110 has been paired with the image processing apparatus 120 in the past. In this case, a distance from the image processing apparatus 120 to this terminal apparatus 110 is measured. Meanwhile, for example, in a case where an identifier of a terminal apparatus 110 within the connection range is not included in the history of pairing, it is determined that this terminal apparatus 110 has not been paired with the image processing apparatus 120 in the past. In this case, a distance from the image processing apparatus 120 to this terminal apparatus 110 is not measured.

In this case, in a case where a terminal apparatus 110 is paired with the image processing apparatus 120 for the first time, a user needs to perform an operation for pairing the terminal apparatus 110 and the image processing apparatus 120. In view of this, in a case where it is determined that a terminal apparatus 110 has not been paired with the image processing apparatus 120 in the past, a selection screen for selecting the terminal apparatus 110 may be displayed on the display unit 125. For example, a list of the terminal apparatuses 110 within the connection range may be displayed on this selection screen. Then, when the user selects a terminal apparatus 110 on this selection screen by using the operation unit 124, the image processing apparatus 120 may be paired with the selected terminal apparatus 110.

According to this modification, only distances of one or some of the terminal apparatuses 110 within the connection range of the communication unit 123 are measured. This lessens a load of processing for measuring distances as compared with a case where distances to a terminal apparatus 110 that has not been connected for wireless communication with the image processing apparatus 120 before are also measured. Furthermore, the number of distances stored in the memory 122 decreases. As a result, a less storage capacity is consumed in the memory 122.

3-4. Modification 4

In the above exemplary embodiment, the image processing apparatus 120 need not be necessarily paired with one terminal apparatus 110. The image processing apparatus 120 may be paired with plural candidate terminal apparatuses 110. However, in this case, priority levels of the plural terminal apparatuses 110 are determined. For example, a higher priority level is given to a terminal apparatus 110 closer to the image processing apparatus 120. The linking processing is performed in accordance with the priority levels. For example, in a case where the image processing apparatus 120 acquires biological information from the terminal apparatus 110, the image processing apparatus 120 may acquire biological information only from a terminal apparatus 110 given a highest priority level and need not acquire biological information from terminal apparatuses 110 given lower priority levels.

3-5. Modification 5

In the above exemplary embodiment, a distance at a certain time included in the first period or the second period or a statistical value such as an average of distances measured during the first period or the second period may be used as the distances during the first period or the second period.

3-6. Modification 6

In the above exemplary embodiment, a target linked with the terminal apparatus 110 is not limited to the image processing apparatus 120. For example, the terminal apparatus 110 may be linked to any processing device (e.g., a home electrical appliance, an audio apparatus, a computer, or a kiosk terminal) that performs processing through wireless communication with the terminal apparatus 110. Furthermore, an initial operation of a user is not limited to an operation for resuming from a sleep mode or an energy-saving mode. This initial operation may be any operation (e.g., an operation of touching a menu screen or an operation of moving a mouse) which a user performs first when using the processing apparatus. Furthermore, processing performed by the image processing apparatus 120 in cooperation with the terminal apparatus 110 is not limited to acquisition of biological information. This processing may be any processing that is performed in cooperation with the terminal apparatus 110.

3-7. Modification 7

In the above exemplary embodiment, a communication standard of communication between the image processing apparatus 120 and the terminal apparatus 110 is not limited to Bluetooth (Registered Trademark). The communication standard may be any communication standard that can establish connection for wireless communication between the image processing apparatus 120 and the terminal apparatus 110.

3-8. Modification 8

An entity that performs the processing of the processing system 100 in the above exemplary embodiment is an example, and this example is not restrictive. For example, at least part of the processing performed in the image processing apparatus 120 may be performed in another apparatus. Furthermore, the procedure of the processing of the processing system 100 in the above exemplary embodiment is an example, and an order of processes may be changed unless inconsistency occurs.

3-9. Modification 9

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

3-10. Modification 10

The present disclosure may be offered as a program executed in the image processing apparatus 120 and the terminal apparatus 110. Note that the image processing apparatus 120 and the terminal apparatus 110 are an example of a computer according to the present disclosure. This program may be downloaded over a communication line such as the Internet or may be offered while being recorded in a computer-readable recording medium such as a magnetic recording medium (e.g., a magnetic tape, a magnetic disc), an optical recording medium (e.g., an optical disc), a magnetooptical recording medium, or a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to
    measure a distance to a terminal apparatus around the information processing apparatus plural times during a first period before receipt of an operation of a user and during a second period after the receipt of the operation, and
    establish connection for wireless communication with the terminal apparatus in a case where the measured distances indicate that the terminal apparatus has approached the information processing apparatus during the first period and is within a close range from the information processing apparatus during the second period.

2. The information processing apparatus according to claim 1, wherein
    in a case where the distance measured during the second period is equal to or smaller than a threshold value continuously for a predetermined period, it is determined that the terminal apparatus is within the close range during the second period.

3. The information processing apparatus according to claim 2, wherein
    the processor is configured to
        acquire a history of the measured distances of the terminal apparatus with which the connection has been established, and
        change a standard used to determine whether or not the terminal apparatus has approached the information processing apparatus during the first period or whether or not the terminal apparatus is within the close range during the second period by using the history of the measured distances.

4. The information processing apparatus according to claim 2, wherein
    the processor is configured to
        change a standard used to determine whether or not the terminal apparatus has approached the information processing apparatus during the first period or whether or not the terminal apparatus is within the close range during the second period in a case where the distances measured during the first period indicate a specific situation.

5. The information processing apparatus according to claim 1, wherein
    the processor is configured to
        measure distances to a plurality of terminal apparatuses around the information processing apparatus, and
        establish the connection with any of the plurality of terminal apparatuses in a case where the distances indicate that the plurality of terminal apparatuses have approached the information processing apparatus during the first period and the plurality of terminal apparatuses are within the close range during the second period.

6. The information processing apparatus according to claim 2, wherein
    the processor is configured to
        measure distances to a plurality of terminal apparatuses around the information processing apparatus, and
        establish the connection with any of the plurality of terminal apparatuses in a case where the distances indicate that the plurality of terminal apparatuses have approached the information processing apparatus during the first period and the plurality of terminal apparatuses are within the close range during the second period.

7. The information processing apparatus according to claim 3, wherein
    the processor is configured to
        measure distances to a plurality of terminal apparatuses around the information processing apparatus, and
        establish the connection with any of the plurality of terminal apparatuses in a case where the distances indicate that the plurality of terminal apparatuses have approached the information processing apparatus during the first period and the plurality of terminal apparatuses are within the close range during the second period.

8. The information processing apparatus according to claim 4, wherein
the processor is configured to
measure distances to a plurality of terminal apparatuses around the information processing apparatus, and
establish the connection with any of the plurality of terminal apparatuses in a case where the distances indicate that the plurality of terminal apparatuses have approached the information processing apparatus during the first period and the plurality of terminal apparatuses are within the close range during the second period.

9. The information processing apparatus according to claim 5, wherein
the processor is configured to establish the connection with a terminal apparatus whose measured distance is smallest among the plurality of terminal apparatuses.

10. The information processing apparatus according to claim 6, wherein
the processor is configured to establish the connection with a terminal apparatus whose measured distance is smallest among the plurality of terminal apparatuses.

11. The information processing apparatus according to claim 7, wherein
the processor is configured to
establish the connection with a terminal apparatus whose measured distance is smallest among the plurality of terminal apparatuses.

12. The information processing apparatus according to claim 8, wherein
the processor is configured to
establish the connection with a terminal apparatus whose measured distance is smallest among the plurality of terminal apparatuses.

13. The information processing apparatus according to claim 5, wherein
the processor is configured to
acquire histories of the connection of the plurality of terminal apparatuses, and
establish the connection with a terminal apparatus that is largest in the number of times of the connection among the plurality of terminal apparatuses.

14. The information processing apparatus according to claim 6, wherein
the processor is configured to
acquire histories of the connection of the plurality of terminal apparatuses, and
establish the connection with a terminal apparatus that is largest in the number of times of the connection among the plurality of terminal apparatuses.

15. The information processing apparatus according to claim 5, wherein
the processor is configured to
display a screen for selecting any of the plurality of terminal apparatuses on the display unit, and
establish the connection with a terminal apparatus selected on the screen among the plurality of terminal apparatuses.

16. The information processing apparatus according to claim 1, wherein
the processor is configured to
cut off the connection when a distance to the terminal apparatus measured after the connection is established becomes equal to or larger than a threshold value.

17. The information processing apparatus according to claim 16, wherein
in a case where the connection has been cut off, the first period and the second period are set on a basis of an operation received first after the distance to the terminal apparatus becomes equal to or larger than the threshold value.

18. The information processing apparatus according to claim 1, wherein
the processor is configured to
acquire a history of the connection of the terminal apparatus, and
measure a distance to the terminal apparatus in a case where the history of the connection indicates that the information processing apparatus has been connected to the terminal apparatus before.

19. The information processing apparatus according to claim 1, wherein
the processor is configured to
acquire a history of the connection of the terminal apparatus, and
omit measurement of a distance to the terminal apparatus in a case where the history of the connection indicates that the information processing apparatus has not been connected to the terminal apparatus before.

20. A non-transitory computer readable medium storing a program causing a computer to execute a process for information processing, the process comprising:
measuring a distance to a terminal apparatus around the information processing apparatus plural times during a first period before receipt of an operation of a user and during a second period after the receipt of the operation, and
establishing connection for wireless communication with the terminal apparatus in a case where the measured distances indicate that the terminal apparatus has approached the information processing apparatus during the first period and is within a close range from the information processing apparatus during the second period.

* * * * *